United States Patent [19]

Suzuoka

[11] Patent Number: 5,245,697
[45] Date of Patent: Sep. 14, 1993

[54] NEURAL NETWORK PROCESSING APPARATUS FOR IDENTIFYING AN UNKNOWN IMAGE PATTERN AS ONE OF A PLURALITY OF INSTRUCTION IMAGE PATTERNS

[75] Inventor: Takashi Suzuoka, Tokyo, Japan

[73] Assignee: Kabushiki Kaisha Toshiba, Kanagawa, Japan

[21] Appl. No.: 688,925

[22] Filed: Apr. 22, 1991

[30] Foreign Application Priority Data

Apr. 24, 1990 [JP] Japan .................. 2-106435

[51] Int. Cl.$^5$ .......................... G06F 13/00
[52] U.S. Cl. ........................ 395/22; 395/23; 382/10
[58] Field of Search ................. 395/22, 23

[56] References Cited

U.S. PATENT DOCUMENTS

| | | | |
|---|---|---|---|
| 3,735,272 | 5/1973 | Nyswander | 328/132 |
| 4,439,864 | 3/1984 | Qureshi | 364/150 |
| 5,003,490 | 3/1991 | Castelaz et al. | 395/22 |
| 5,023,819 | 6/1991 | Pitts | 364/558 |
| 5,056,897 | 10/1991 | Akiyama et al. | 395/25 |
| 5,060,275 | 10/1991 | Fukumizu | 395/22 |

OTHER PUBLICATIONS

Lippman, Richard P., "An Introduction to Computing with Neural Nets", IEEE ASSP Mag, Apr. 1987.
Rumelhart et al, "Learning Representations by Error Propagation", Parallel Distributed Processing, vol. 1, Foundations, 1986, pp. 318-362.
Hinton et al., "Boltzmann Machines: Constraint Satisfaction Networks that Learn", Tech. Report CMU-CS-84, 119, 1984.
Szu, H., "Fast Simulated Annealing", AIP Conference Proceedings 151, 1986, 420-425.
Bilbro et al., "Optimization by Mean Field Annealing", Advances in Neural Info. Proc. Syst. I, 1989, 91-98.
J. J. Hopfield, "Neurons with graded response have collective computational properties like those of two-state neurons", Proceedings of the National Academy of Sciences 81:3088-3092, 1984, pp. 579-583.

Primary Examiner—Michael R. Fleming
Assistant Examiner—Robert W. Downs
Attorney, Agent, or Firm—Finnegan, Henderson, Farabow, Garrett & Dunner

[57] ABSTRACT

A neural network processing apparatus calculates an average of the absolute values of differences between the output values of all neurons and a center value whenever the output value of all neurons change, and calculates the difference between the average and the previous average. If the average is larger than a threshold or the previous average, the gain of a function in the network is decreased. If the average is smaller than the threshold or the previous average, the gain of the function is increased. Then the controlled function is set to each neuron and the neural network is activated repeatedly to correctly identify an unknown multivalued image pattern.

17 Claims, 9 Drawing Sheets

PATTERN 0

PATTERN 1

PATTERN 2

PATTERN 3

PATTERN 4

PATTERN 5

NEURAL NETWORK PROCESSING APPARATUS FOR IDENTIFYING AN UNKNOWN IMAGE PATTERN AS ONE OF A PLURALITY OF INSTRUCTION IMAGE PATTERNS

BACKGROUND OF THE INVENTION

1. Field of the Invention

The present invention relates generally to optical character readers, and more particularly to a neural network processing apparatus in an optical character reader for identifying unknown image patterns.

2. Description of the Background

Recently, unknown image patterns have been processed by association in a neural network. The neural network is comprised of a plurality of discrete processing modules, or "neurons." Inputs of each neuron are linked to the outputs of other neurons of the network, such that the signals between neurons are conditioned by weighting factors (weights). Each neuron processes an input signal according to a predetermined transfer function to produce an output signal.

The Hopfield model is a well-known example of a neural network. In the Hopfield model, an output value of a neuron is calculated from the output values of other interconnected neurons and corresponding weights between the neurons. The output value of a neuron is then supplied to the interconnected other neurons. The Hopfield model is represented as follows:

$$V_j = f(u_j) \quad (1)$$

$$u_j = \delta u_j + (1-\delta)(\Sigma_i T_{ji} V_i - I_j) \quad (2) \; Z$$

where:

$V_j$ = output value of neuron j
$u_j$ = input value of neuron j
f = a monotonic increment function having a maximum and a minimum
$\delta$ = inertial constant ($0 < \delta < 1$)
$T_{ji}$ = weight between neuron i and neuron j
$I_j$ = threshold of neuron j (a constant value)

The formulae (1) and (2) represent that output value $V_j$ of neuron j is calculated by multiplication of output value $V_i$ of neuron i and weight $T_{ji}$, subtraction of $I_j$ from the sum of the multiplication, and operation of the function f upon the subtraction. If the output value of the neuron changes, the output values of other interconnected neurons change. Therefore, to calculate the final output value of the neuron, the calculation of the formulae (1) and (2) is repeated for all neurons until the output values of all neurons become unchanging.

Figure 1:
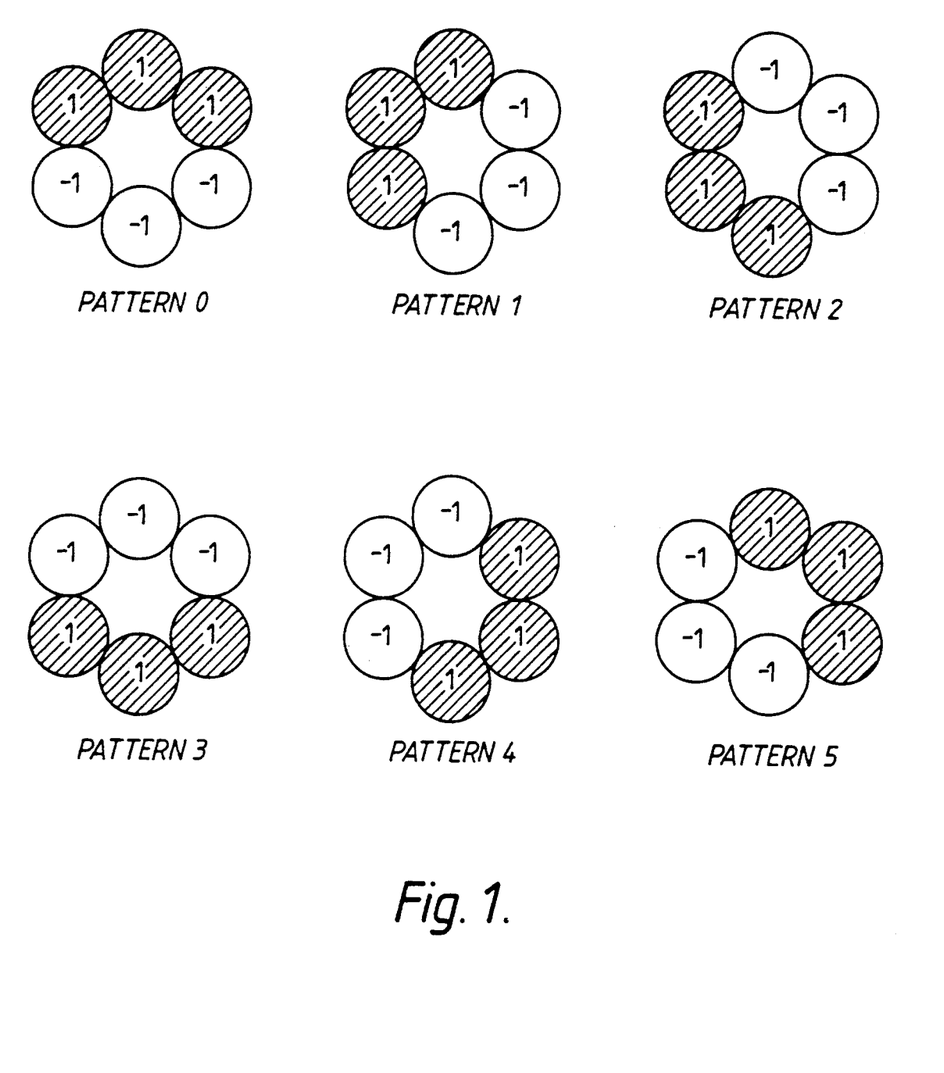
FIG. 1 shows six kinds of instruction image patterns.

Next, an example for identifying unknown image patterns by the Hopfield model is explained. FIG. 1 shows six kinds of image patterns, which consists of three continuous black pixels ("1") and three continuous white pixels ("−1"). This set of image patterns, referred to as instruction image patterns, constitutes the set of possible image patterns from which an unknown image pattern can be identified.

Figure 5:
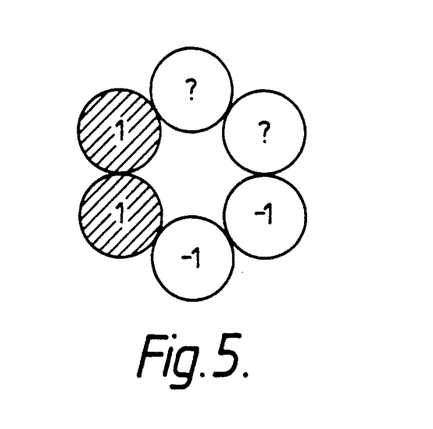
FIG. 5 shows unknown image pattern.

In performing a character recognition operation, it is often the case that a portion of an image pattern is missing, blurred, or indistinct. Such image pattern constitutes an unknown image pattern. An example of an unknown image pattern is shown in FIG. 5. If discrete portions (pixels) of an unknown image pattern are each associated with one neuron, the set of output values of all neurons in the network can be used to identify the associated unknown image.

Figure 2:
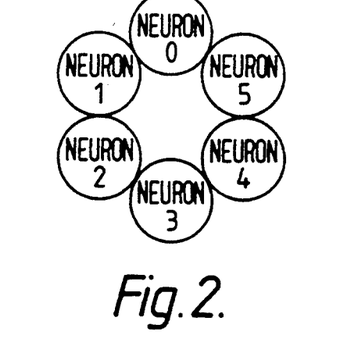
FIG. 2 shows the neurons of a network corresponding to the image patterns of FIG. 1.

A neural network containing six neurons, each corresponding to one of the six pixels of the instruction image patterns, is shown in FIG. 2. In this case, the output value of each neuron associated with a black pixel is "1", and the output value of each neuron associated with a white pixel is "−1". If two neurons associated with the instruction patterns have a tendency to generate the same output value simultaneously, the neural network is configured such that a positive weight is set between the two neurons. If two neurons have tendency to generate different output values simultaneously, the neural network is configured such that a negative weight is set between the two neurons.

Figure 3:
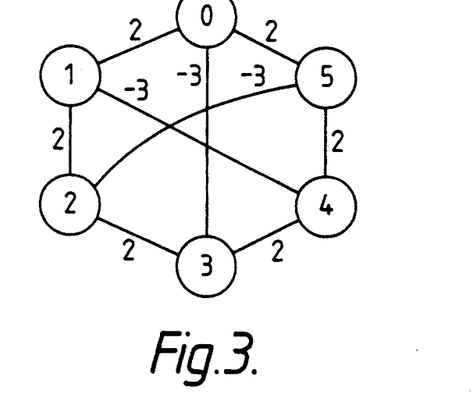
FIG. 3 shows the weight between the neurons of FIG. 2.

FIG. 3 shows a neural network configured to identify unknown image patterns consisting of one of the instruction patterns of FIG. 1. In FIG. 3, absolute values of weights between two opposite neurons are larger than the absolute values of weights between two neighboring neurons. The reason for this is that the probability for two opposite neurons of the instruction patterns of FIG. 1 to generate different values (black and white) is larger than the probability for two neighboring neurons of the instruction patterns of FIG. 1 to generate same values (black or white).

Figure 4:
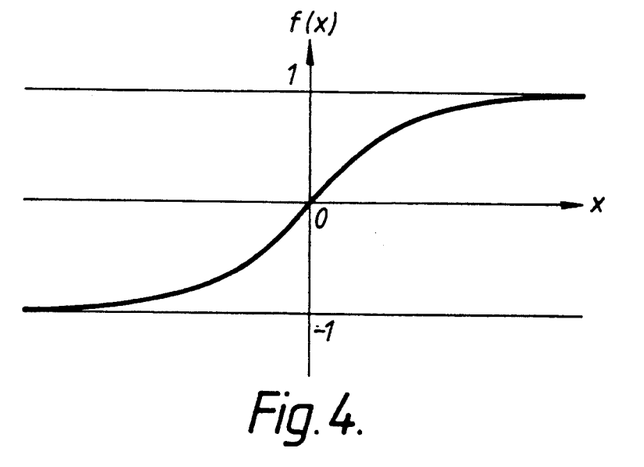
FIG. 4 shows a monotonic increment function.

The monotonic increment function may consist of the hyperbolic function "tanh" whose limit is $(-1,1)$ as shown in FIG. 4. ($I_j=0$) In this case, the association of one of the instruction image patterns with an unknown image pattern, having two undetermined pixels, is explained.

For example neurons 0, 1, 2, 3, 4, 5 of FIG. 3 having respective output values of $V_0$, $V_1$, $V_2$, $V_3$, $V_4$, $V_5$, are associated with pixels of the unknown image pattern of FIG. 5 as follows:

($V_0$, $V_1$, $V_2$, $V_3$, $V_4$, $V_5$) = (unknown, 1, 1, −1, −1, unknown)

To associate the output value of neurons 0 and 5, the following steps are processed.

1. The determined values ($V_1$-$V_4$) are assigned to the output values of the neurons (1-4) as initial values, and the output values of the neurons (0 and 5) are initially set to "0".

2. The calculation of formulae (1) and (2) is performed for all neurons. As a result of these calculations, the values $V_0 \ldots V_5$ change from initial values to new values.

3. The calculation of formula (1) and (2) is again performed for all neurons, using as input values the new output values obtained in step 2.

4. The calculation of the formulae (1) and (2) is repeatedly performed for all neurons, using as input values the output values obtained by the previous calculation until the output values of all neurons become unchanging.

The set of output values of the neurons of FIG. 3, which are unchanging, correspond to the pixels of the pattern of FIG. 5 and constitute an identification of the unknown image pattern. If the output value of a neuron, which is unchanging, is positive value, the corresponding pixel is black. If the output value of neuron, which is unchanging, is negative value, the corresponding pixel is white. In this example, the output value $V_0$ is "1" and $V_5$ is "−1", and the unknown image is identified as pattern 1 in FIG. 1.

As the noted above, the method for identifying binary image patterns (black and white) by using the neural network is known. However, a method for identifying multivalued image patterns (images formed of grayscale pixels including black and white) has not been developed. In the prior art, the output value of a neuron is desired to be maximum ("1") or minimum ("−1") and it is not desired to be distributed gradually from maximum to minimum.

The distribution of the output value of a neuron depends on the transfer function f. As for change of the distribution of the output according to the gain λ of the monotonic function f(X), the function can be represented as follows.

$$f(X) = \begin{cases} -1 & \lambda X \leq -1 \\ \lambda X & |\lambda X| < 1 \\ 1 & \lambda X \geq 1 \end{cases} \quad (3)$$

Figure 6:
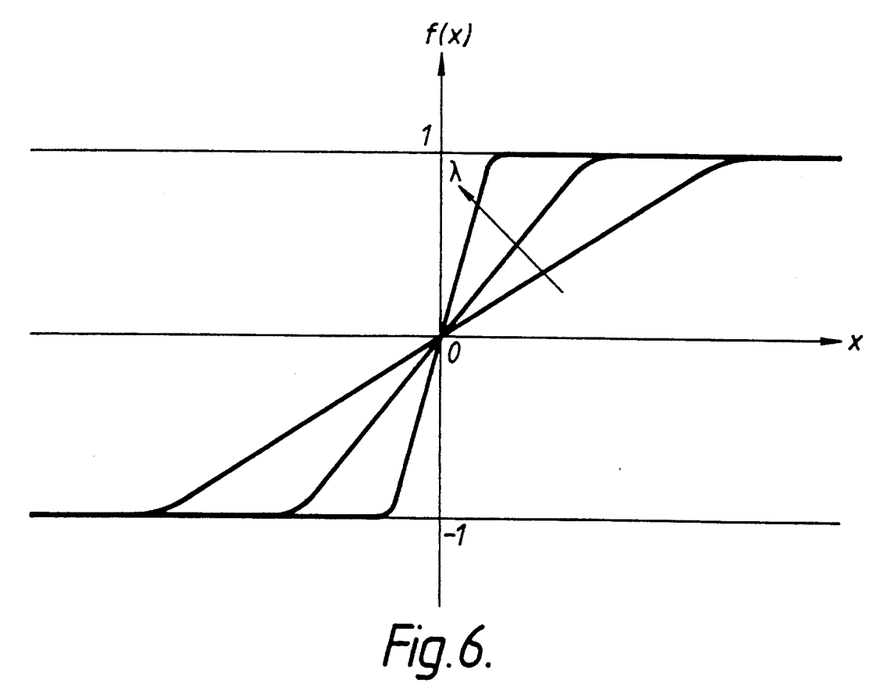
FIG. 6 shows the effect of a change of the gain of the function of FIG. 4.

The formula (3) indicates that if the input value X is from "−1" to "1", the function f(X) shows a linear characteristic of slope λ. If the output value is above "1", the function f(X) is saturated with "1". If the output value is below "−1", the function f(X) is saturated with "−1". As shown in FIG. 6, the larger the value of λ is, the larger is the slope of f(X) in the vicinity of X=0. The smaller the value of λ is, the smaller is the slope of f(X) in the vicinity of X=O. In short, if the value of λ is large, the distribution of the output value of the neurons is biased to maximum and minimum. If the value of λ is small, the distribution of the output value of the neurons is biased to nearly "0". Accordingly, to associate a multivalued image pattern correctly, the value of λ must be controlled dynamically in order to insure that the output values of the neurons at steady state correctly identify an unknown multivalued pattern. However, in the prior art, such control method has not been developed.

SUMMARY OF THE INVENTION

Accordingly, it is one object of the present invention to provide a neural network processing apparatus for smoothly controlling the function as the output value of the neurons approaches steady state.

It is another object of the present invention to provide a neural network processing apparatus for correctly identifying an unknown multivalued image pattern.

These and other objects of the present invention are accomplished by providing a neural network processing apparatus, which comprises a plurality of neurons for generating an output signal by performing an operating function on an input signal, the function having a gain; network means for interconnecting the neurons and for setting a weight according to the strength of connection between the neurons; activator means for activating the network means for each neuron to enter as the input signal the weighted sum of the output signals of interconnected other neurons and corresponding weight between the neurons, and to generate the output signals; and calculation means for repeatedly calculating an average of the absolute values of differences between the output values of all neurons and a center value, and for calculating a difference between a current value of the average and a previous value of the average. The apparatus also comprises function control means for determining the gain of the function according to the difference between the current value of the average and a threshold, and according to the difference between the current value of the average and the previous value of the average; and function set means for setting the gain of the function determined by the function control means for each neuron.

DESCRIPTION OF THE PREFERRED EMBODIMENTS

In order to insure that the output values of the neurons properly identify a multivalued image pattern, the average of absolute value between the current output value of a neuron and a center value must be a predetermined value. The center value is an average of distribution of the output values of all neurons at a given point in time and it may be the average of maximum and minimum of the output values of all neurons. The predetermined value is an average of absolute values between the output values of the neurons of the instruction image patterns and the center value for the instruction image patterns, as set forth below:

$$X = \frac{1}{N} \sum_i |V_i - M| \quad (4)$$

Where:

X = average of absolute value between the output value of the neurons and the center value for the unknown image pattern $V_i$ = output value of neuron "i"

M = center value

N = the number of the neurons

Moreover, the difference of X per unit time is represented as "D" and the predetermined value is represented as "a". Furthermore, the value "a" is equal to X for the instruction image patterns. So that "X" may approach "a", the following condition is necessary:

· "X" is approaching near "a" (X→a)

· "D" is approaching near "0" (D→0)

Accordingly, to control "X" and "D" dynamically, the following condition is necessary:

· When "X" is larger (smaller) than "a", "λ" is decreased (increased) according to the degree.

· When "D" is larger (smaller) than "0", "λ" is decreased (increased) according to the degree.

As for the hyperbolic function f(X), where f(X)=tanh (λX) and λ=gain of function, λ must be controlled dynamically as follows to provide a new value of λ, $\lambda_n$:

$$\lambda_n = (1 + K_1(a-X) - K_2 D)\lambda_{n-1}, K_1 > 0, K_2 > 0 \quad (5)$$

Figure 7:
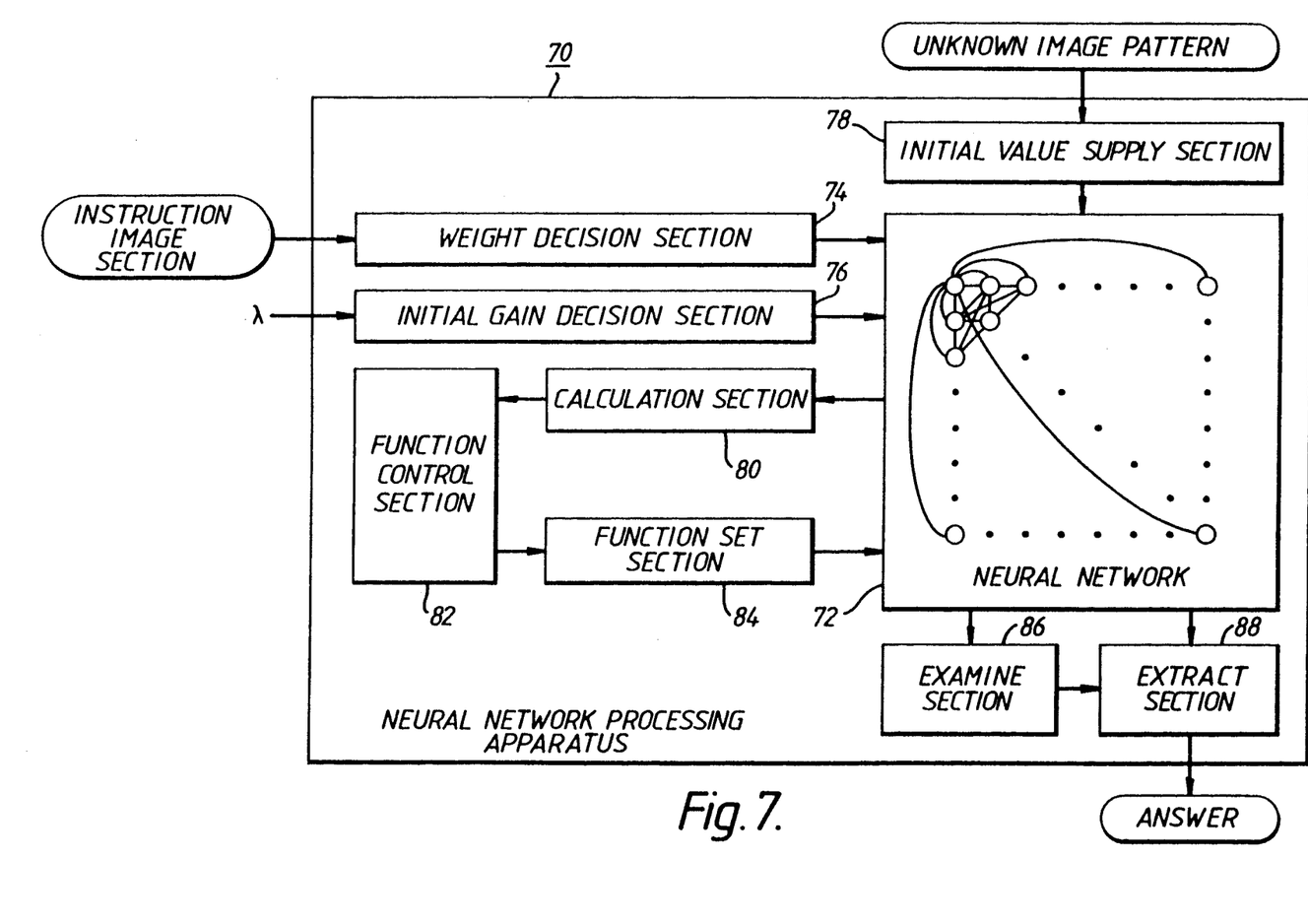
FIG. 7 shows a block diagram of a neural network processing apparatus constituting a preferred embodiment of the present invention.

FIG. 7 shows a block diagram of a neural network processing apparatus 70 which constitutes a preferred embodiment of the present invention. The neural network processing apparatus 70 includes a neural network 72 for updating the output of the neurons repeatedly, an unknown image pattern is supplied to neural network 72 as an initial value. In the preferred embodiment, apparatus 70 is implemented in a high-speed general purpose computer, such as a Sun Microsystems, Inc Sparc Station. Alternatively, one or more components of apparatus 70 may be implemented as special purpose processors. Neural network 72 may be implemented in a high speed computer using general principles well-known in the art. Such principles are explained, for example, in Proc. Natl. Acad. Sci. U.S.A., Vol. 81, pp. 3088-3092; "Neurons with Graded Response Have Collective Computation Properties Like Those of Two-state Neurons." In neural network 72, all neurons are interconnected and perform according to the Hopfield model discussed above.

Figure 14:
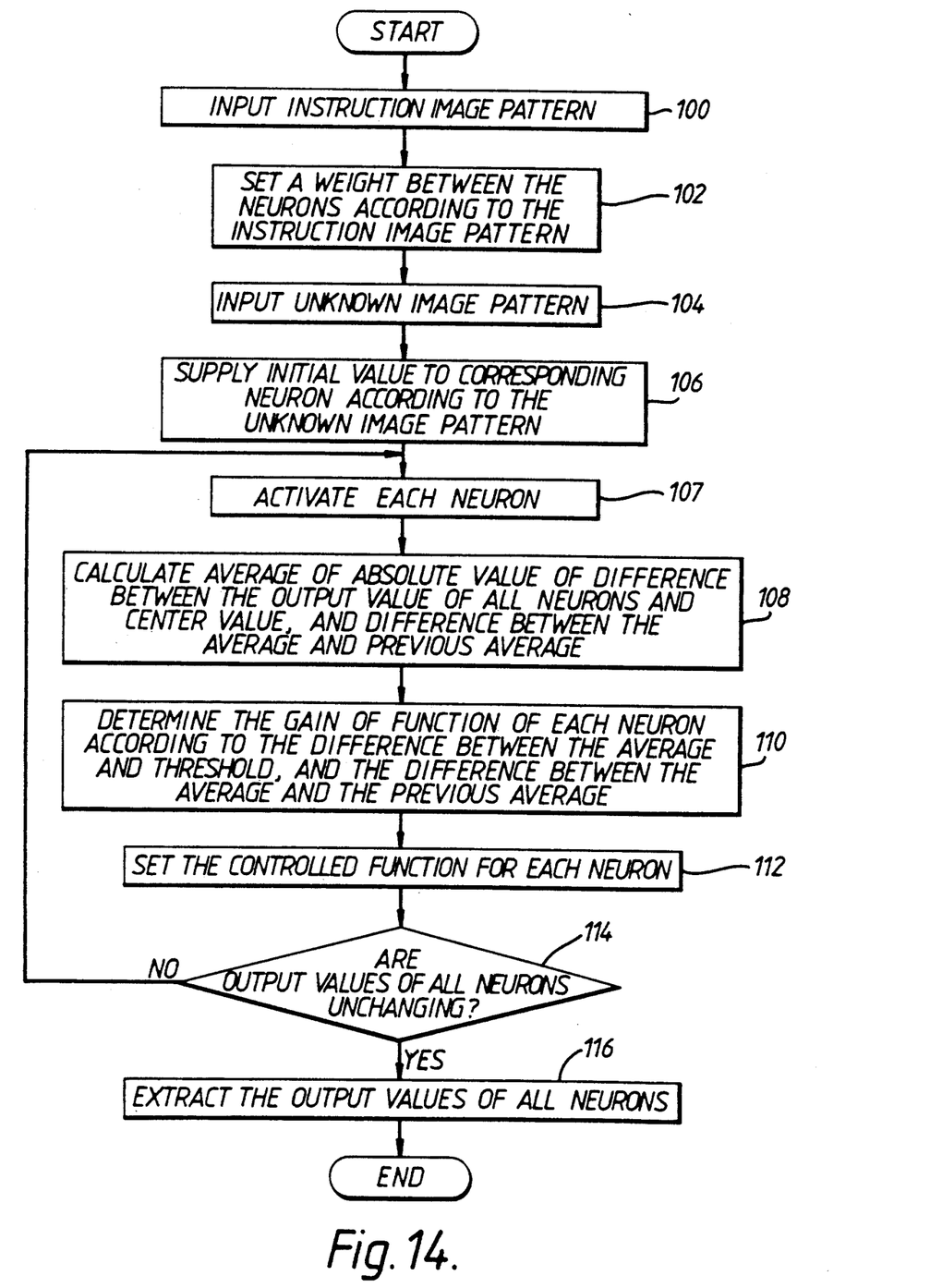
FIG. 14 is a logic flow chart of a method which constitutes a preferred embodiment of the present invention.

The operation of apparatus 70 will now be described. FIG. 14 shows a logic flow chart of a method which constitutes a preferred embodiment of the present invention. Firstly, instruction image patterns are supplied to a weight decision section 74, to permit the apparatus to memorize the pixel patterns thereof (step 100 in FIG. 14). Section 74 analyzes such pixel patterns and determines probabilities between pixels (such as the opposite and adjacent pixel probabilities discussed previously), determines the weight according to the instruction image patterns and sets the weight between neurons corresponding to the pixels of the instruction image patterns (step 102 in FIG. 14). (The calculation of the weight is explained afterwards).

An initial gain decision section 76 determines the initial value of the gain of the transfer function according to past experimental results, and sets the gain λ for each neuron in the neural network 72. The operation of sections 74 and 76 is well-known in the art and will not be discussed in detail.

An unknown image pattern is then supplied to an initial value supply section 78 (step 104 in FIG. 14). Section 78 supplies the determined value of each known pixel of the unknown image pattern to corresponding neuron of network 72 (step 106 in FIG. 14). Section 78 also assigns an initial value of zero to each neuron corresponding to a pixel of unknown value, and neural network 72 begins to activate and repeatedly calculates output values of each neuron (step 107 in FIG. 14).

Sections 80, 82, and 84 are concerned with the present invention directly. A calculation section 80 examines the distribution of the output values of the neurons whenever the output values of all neurons are updated (step 108 in FIG. 14). In short, section 80 calculates the average "X" of the absolute value between the output values of all neurons and the current center value, according to formula (4). Section 80 also calculates the difference "D" between the present average and the previous average: D =(the average current values of "X")−(the average of immediate previous values of "X"). Section 80 sends the current average "X" and the difference "D" to the function control section 82. Section 82 calculates a new gain "$\lambda_n$" as follows (step 110 in FIG. 14).

$$\lambda_n = (1 + K_1(a-X) - K_2 D)\lambda_{n-1}, K_1 > 0, K_2 > 0$$

The rate of change "$K_1(a-X) = K_2 D$" is limited from "−3" percent to "3" percent. In this case, if the rate of change is larger than "0.03", it is set to "0.03". If the rate of change is smaller than "−0.03", it is set to "−0.03". Accordingly, the output value of the neurons does not change suddenly, and it is possible for the neural network to smoothly approach steady state. In short, maximum and minimum values of "λ" are supplied, and "λ" is controlled within the maximum and minimum. Then, section 82 sends the new gain λ to the function set section 84. Section 84 supplies a new transfer function, including the new gain, to each neuron in the neural network 72 (step 112 in FIG. 14).

An examine section 86 monitors the output values of the neurons. When the output values of the neurons are unchanging over a predetermined time, section 86 sends a signal to an extract section 88 (step 114 in FIG. 14). At this time, the neural network is in a steady (or stable) state. Extract section 88 extracts the output values of all neurons and outputs the set of these values corresponding to the pixels of the unknown image pattern, as the "answer", that is, the identification of the unknown pattern (step 116 in FIG. 14).

Next, a specific example of the present invention is explained. This example is the case for associating an image pattern which is composed of two hundred fifty-six pixels. Each pixel has a gray color of various shades from white to black. In the same manner as the prior art, a neuron is respectively assigned to each pixel and the pixel shades are represented by the numerical value. In short, a white pixel is "−1", a black pixel is "1", and a gray pixel has a value between −1 and 1. The darker the pixel, the larger the value.

Figure 8:
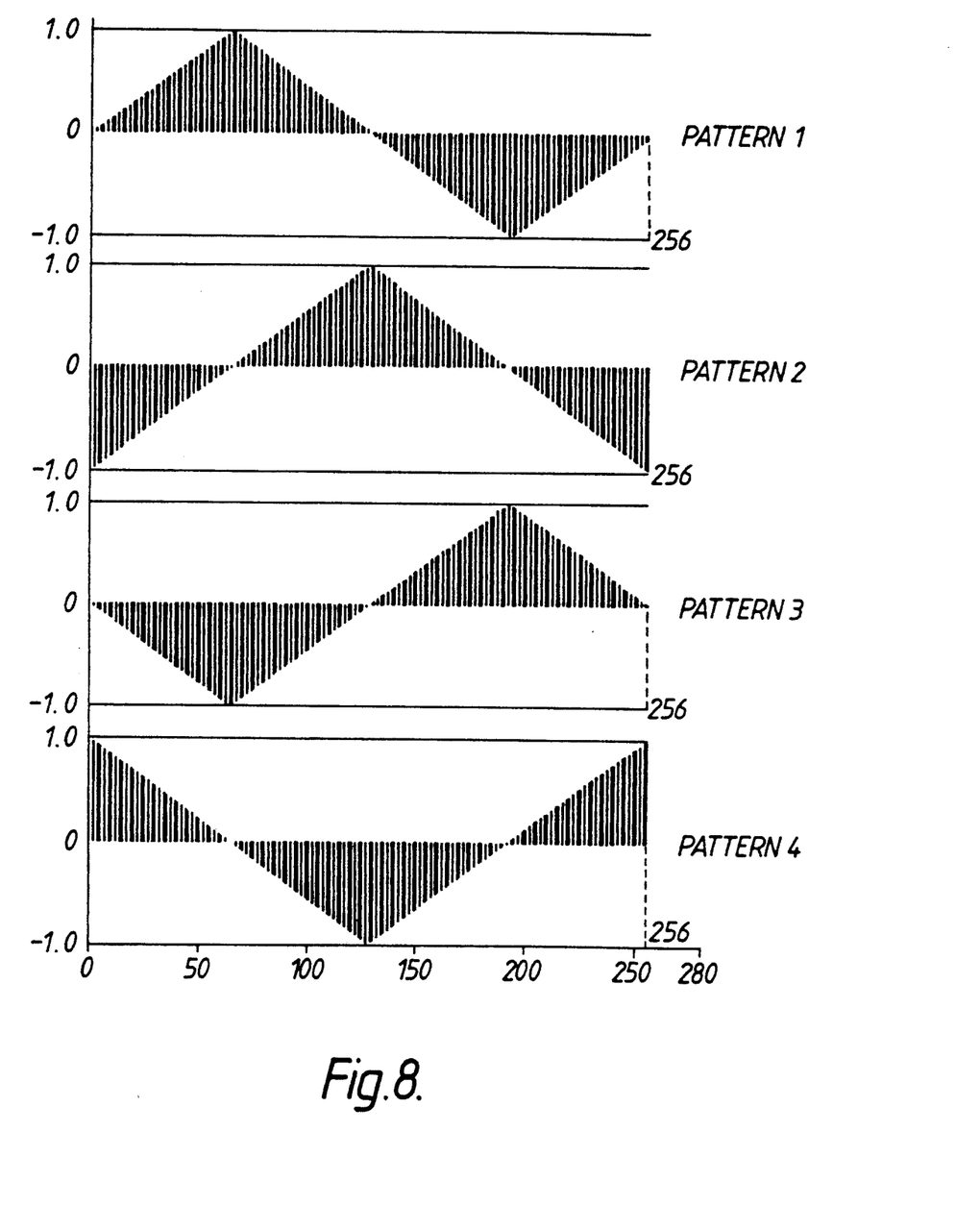
FIG. 8 shows four kinds of an instruction image pattern utilized by the apparatus of FIG. 7.

FIG. 8 shows four kinds of grayscale image patterns (multivalued patterns) which constitute instruction image patterns. The horizontal axis represents the neuron number (pixel number) and the vertical axis represents the value of shade. FIG. 8 is drawn as a line graph centering around the shade "0". When the instruction image patterns (as shown in FIG. 8) are supplied, the weight $T_{ji}$ between neuron j and neuron i is calculated as follows.

$$T_{ji} = \frac{1}{4} \sum_{s=1}^{4} V_j^s V_i^s$$

where:

$VS_j$ = the value of shade of the pixel j in a specific instruction image pattern The above-mentioned formula (3) is used as the function f. It assumes that the center value is "0", "$\delta = 0.9$" and "$I_j = 0$".

Figure 9:
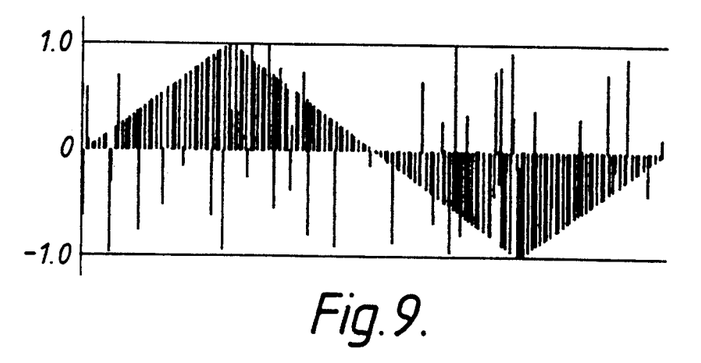
FIG. 9 shows the instruction image pattern 1 with noise, constituting unknown image pattern.

FIG. 9 shows an image pattern (similar to image pattern 1 of FIG. 8) with noise. This pattern is made from selecting fifty-one pixels of the two hundred fifty-six pixels and assigning a random value of shade to each of the fifty-one pixels. When the noisy image pattern of FIG. 9 is supplied as an unknown image pattern, neural network apparatus 70 of FIG. 7 examines it and identifies it as corresponding to image pattern 1 of FIG. 8.

Figure 10:
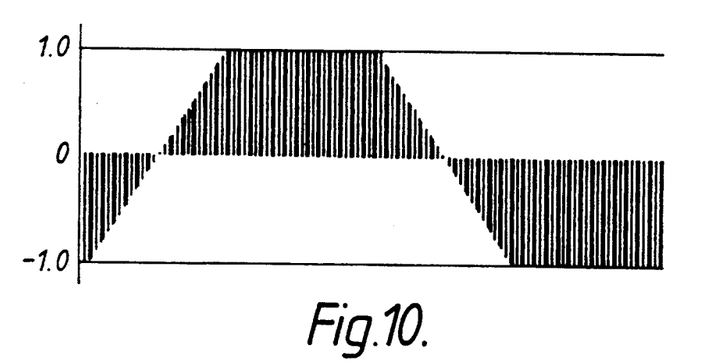
FIG. 10 shows the associated result as "λ=0.025" for the unknown image pattern of FIG. 9.

Firstly, the case is explained in which the value of $\lambda$ is fixed, according to the prior art. If the value of $\lambda$ is, by chance, selected to be "0.0236", the image pattern 1 is associated correctly. However, if the value of $\lambda$ is selected to be smaller than "0.0236", the output value of all neurons is "0". If the value of $\lambda$ is selected to be larger than "0.0236", the associated pattern is distorted. For example, if the value of $\lambda$ is "0.025", the unknown image is incorrectly identified as the mixed image pattern of pattern 1 and pattern 2 of FIG. 8, as shown in FIG. 10. The value of $\lambda$ necessary to provide correct identification is from "0.0236" to a slightly larger value The fact that the output value of all neurons is "0" if the value of $\lambda$ is smaller than a predetermined value (0.0236) is proved as follows. The above-mentioned formulae (1)(2) are represented as next formula.

$$V = \lambda TV$$

where:
n = the number of all neurons
$V = (V_1, V_2, ..., V_n)$; the output value of neurons
T = n × n matrix of the weights If the image pattern is associated correctly in case of "$\lambda = \lambda_0$", the next formula is represented as for the associated pattern P.

$$P = \lambda_0 TP$$

$$\therefore (\lambda_0 T)^n P = P$$

as for $\lambda_1 < \lambda_0$ $$(\lambda_1 T)^n P = (\lambda_1/\lambda_0)^n (\lambda_0 T)^n P = (\lambda_1/\lambda_0)^n P$$

because of $(\lambda_1/\lambda_0) < 1$ $$(\lambda_1/\lambda_0)^n \to 0$$

However, the correct value must be determined experimentally. Moreover, even if a gain value of 0.0236 is selected, the operating time for the neural network to attain steady state is long.

Secondly, the case is explained in which the value of $\lambda$ is changed dynamically, according to the present invention. In short, the value of $\lambda$ is changed according to the average X and the difference D. The transformation formula of $\lambda$ is represented as follows.

$$\lambda_n = (1 + 0.1(a-X) - D)\lambda_{n-1};$$

where:
n = a calculation iteration number
The value of "a" is determined by the value of shades of all pixels of the instruction image patterns as follows.

$$a(n/4) \sum_s \sum_i |v_i^s|$$

Figure 12:
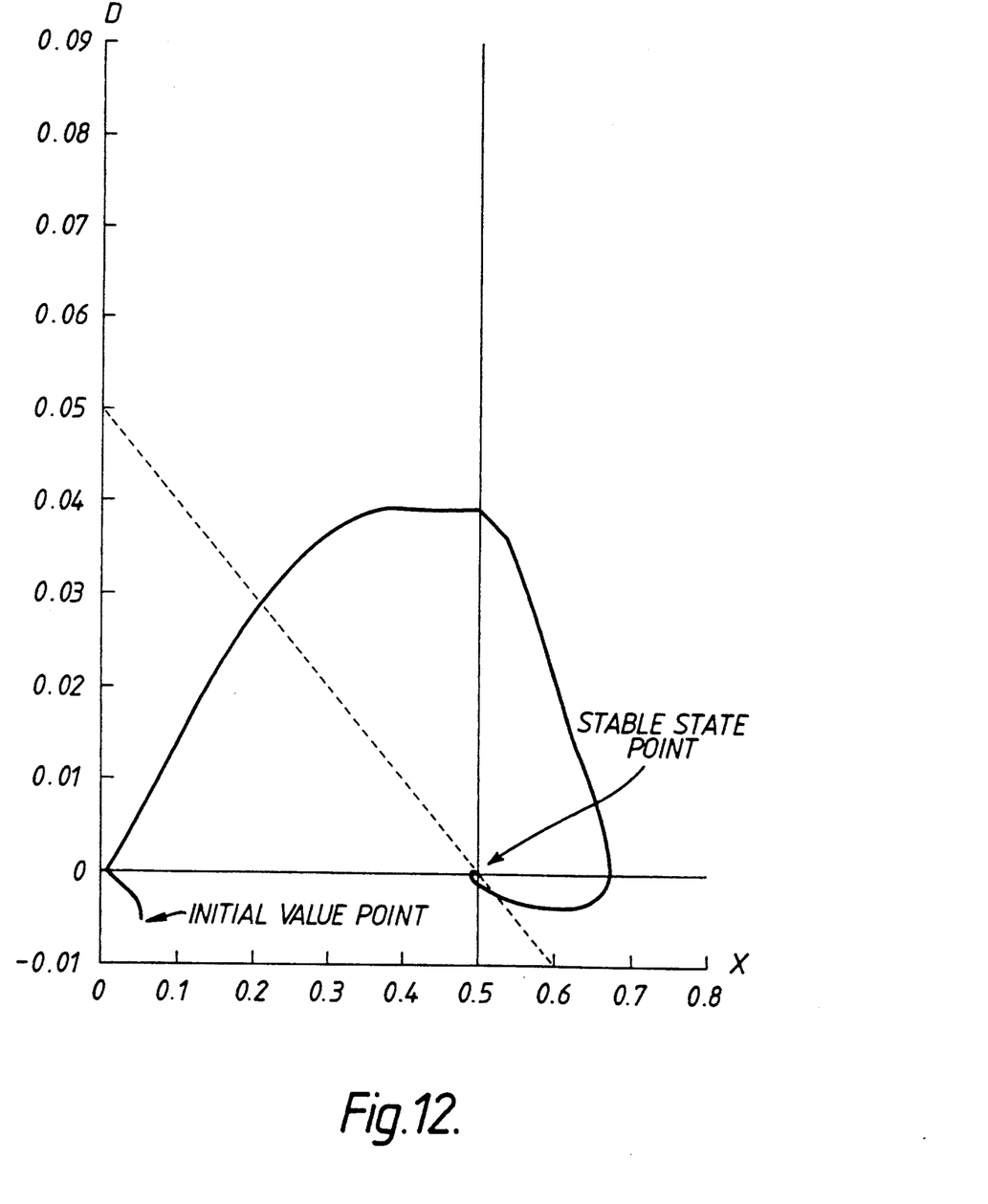
FIG. 12 shows a locus of the average and the difference between the average and previous average as "the initial value of λ=0.004" according to the preferred embodiment of the present invention.

In case that the initial value of $\lambda$ is "0.004", the image pattern 1 with noise (as shown in FIG. 9) is supplied as unknown image pattern. As the neural network is repeatedly executed to calculate a set of output values, the values of "X" and "D" change, drawing the locus as shown in FIG. 12 and resulting in the point "X = 0.5, D = 0". The dot line of FIG. 12 is represented the formula:

$$0.1(a-X) - D = 0$$

Note that the term "0.1 (a-x)-D" appears in formula (5) with $k_1 = 0.1$, $K_2 = 1$.

Figure 13:
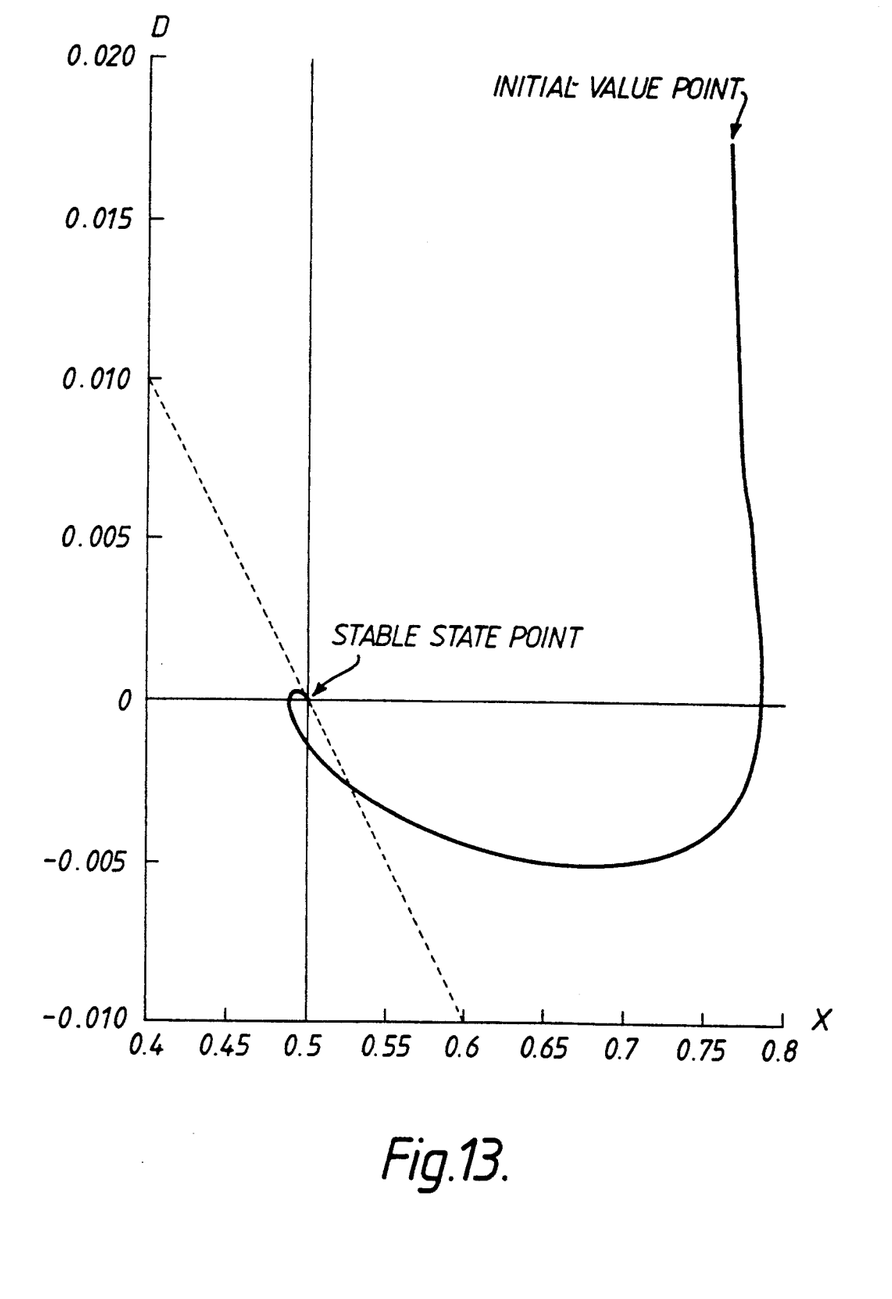
FIG. 13 shows a locus of the average and the difference between the average and previous average as "the initial value of λ=0.06" according to the preferred embodiment of the present invention.

In the case in which the initial value of $\lambda$ is "0.06", the image pattern 1 with noise (as shown in FIG. 9) is supplied as unknown image pattern. As the neural network is repeatedly executed to calculate a set of output values, "X" and "D" draw the locus as shown in FIG. 13 and result in the point "X = 0.5, V = 0". (In FIG. 13, the dot line is the same as the dot line of FIG. 12.) As noted in the above-mentioned two cases, the unknown image pattern is correctly identified as image pattern 1 at the stable state point (X = 0.5, V = 0). Therefore, it can be appreciated that the selection of the initial value of gain $\lambda$ is not critical, and the present invention permits proper identification of an unknown multivalued image pattern using an arbitrary selection of initial value of gain $\lambda$.

Figure 11:
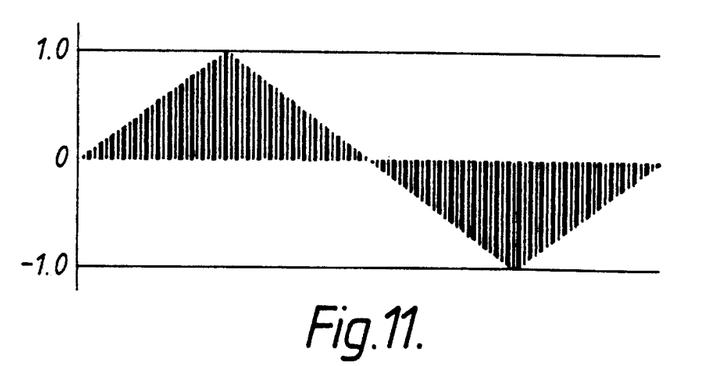
FIG. 11 shows the associated result by controlling λ according to a preferred embodiment of the present invention.

FIG. 11 shows the associated image pattern produced by the steady state set of neuron output values obtained by the above-mentioned two cases. This associated image pattern is the same as the image pattern 1 as shown in FIG. 8, and the noisy unknown image pattern of FIG. 9 is correctly identified as instruction image pattern 1.

It will be apparent to those skilled in the art that various modifications and variations can be made in the bus interface circuitry and interface of this invention without departing from the spirit or scope of the present invention. The present invention covers such modifications and variations which are within the scope of the appended claims and their equivalents.

What is claimed is:

1. A neural network processing apparatus, comprising:
   a plurality of neurons functioning as a group to generate an output signal by performing an operating function on an input signal, the operating function having a gain;
   a network for interconnecting the plurality of neurons and for setting weights according to the strengths of connections between the plurality of neurons;
   activator means for activating each neuron of the plurality of neurons to receive as a neuron input signal the weighted sum of the output signals of interconnected other neurons of the plurality of neurons and corresponding weight between the plurality of neurons, and to generate the output signals;
   calculation means for repeatedly calculating an average of the absolute values of differences between the output values of all of the plurality of neurons and a center value, and for calculating a difference between a current value of the average and a previous value of the average;

function control means for determining the gain of the operating function according to the difference between the current value of the average and a threshold, and according to the difference between the current value of the average and the previous value of the average; and function set means for setting the gain of each neuron using the gain of the operating function determined by the function control means for each neuron.

2. The neural network processing apparatus according to claim 1, wherein the center value is an average of the output values of all of the plurality of neurons.

3. The neural network processing apparatus according to claim 2, wherein the threshold is an average of the absolute value of the difference between the output values of all of the plurality of neurons and the center value for the instruction image pattern.

4. The neural network processing apparatus according to claim 3, wherein the operating function is represented as $f(\lambda u)$ and wherein the function control means calculates a new value of $\lambda$, $\lambda_n$; where:

u = the input value of the neuron $\lambda_n \leftarrow (1 + K_1(a-X) - K_2D)\lambda_{n-1}$ $K_1$, $K_2$ = positive constants a = the threshold X = the average of the absolute values of differences between the output values of all of the plurality of neurons and the center value.

D = the difference between the average and the previous average.

5. The neural network processing apparatus according to claim 4, wherein the function control means restricts a rate of change of the gain $K_1(a-x) - K_2D$ within predetermined limits.

6. The neural network processing apparatus according to claim 1, wherein the center value is an average of a maximum output value and a minimum output value of the plurality of neurons.

7. The neural network processing apparatus according to claim 1, wherein the network means determines the weights according to an instruction image pattern.

8. The neural network processing apparatus according to claim 1, wherein the activator means begins activating the network means according to an initial value, when output values of an unknown pattern are supplied to corresponding neurons as the initial value.

9. The neural network processing apparatus according to claim 1, wherein the calculation means calculates the average whenever output values of all of the plurality of neurons change.

10. The neural network processing apparatus according to claim 9, wherein the function control means decreases the gain of the operating function when the average is larger than the threshold.

11. The neural network processing apparatus according to claim 9, wherein the function control means increases the gain of the operating function when the average is smaller than the threshold.

12. The neural network processing apparatus according to claim 9, wherein the function control means decreases the gain of the operating function when the average is larger than the previous average.

13. The neural network processing apparatus according to claim 9, wherein the function control means increases the gain of the operating function when the average is smaller than the previous average.

14. The neural network processing apparatus according to claim 1, wherein the activator means reactivates the network whenever the operating functions of the plurality of neurons are set by the function set means.

15. The neural network processing apparatus according to claim 14, further comprising examine means for determining that the plurality of neurons are in a stable state based upon a determination that the output values of all of the plurality of neurons are unchanging for a predetermined time.

16. The neural network processing apparatus according to claim 15, further comprising extract means for extracting the output values of all of the plurality of neurons, which correspond to the unknown pattern, when the plurality of neurons are determined to be in the stable state by the examine means.

17. A neural network processing apparatus, comprising:

a plurality of neurons functioning as a group to generate an output signal by performing an operating function on an input signal, the operating function having a gain;

a network for interconnecting the plurality of neurons and for setting weights according to the strengths of connections between the plurality of neurons;

activator means for activating each neuron of the plurality of neurons to receive as a neuron input signal the weighted sum of the output signals of interconnected other neurons of the plurality of neurons and corresponding weight between the plurality of neurons, and to generate the output signals;

calculation means for calculating an average of the absolute values of differences between the output values of all of the plurality of neurons and a center value whenever the output values of all of the plurality of neurons change, and for calculating a difference between a current value of the average and a previous value of the average;

function control means for determining the gain of the operating function by decreasing the gain of the operating function when the current value of the average is larger than a threshold or the previous value of the average, and by increasing the gain of the operating function when the current value of the average is smaller than the threshold or the previous value of the average; and function set means for setting the gain of each neuron using the gain of the operating function determined by the function control means for each neuron.

* * * * *